US012804108B2

(12) United States Patent
Lu et al.

(10) Patent No.: US 12,804,108 B2
(45) Date of Patent: Nov. 17, 2026

(54) PROJECTION DEVICE

(71) Applicant: Coretronic Corporation, Hsin-Chu (TW)

(72) Inventors: Cheng-Han Lu, Hsin-Chu (TW); Chih-Sheng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 411 days.

(21) Appl. No.: 18/460,707

(22) Filed: Sep. 5, 2023

(65) Prior Publication Data

US 2024/0080417 A1 Mar. 7, 2024

(30) Foreign Application Priority Data

Sep. 6, 2022 (CN) ........................ 202211082420.X

(51) Int. Cl.
*H04N 9/31* (2006.01)
*G03B 21/16* (2006.01)

(52) U.S. Cl.
CPC ........... *H04N 9/3144* (2013.01); *G03B 21/16* (2013.01); *H04N 9/3197* (2013.01)

(58) Field of Classification Search
CPC .............................. G03B 21/16; H04N 9/3144
See application file for complete search history.

(56) References Cited

U.S. PATENT DOCUMENTS

| | | | | |
|---|---|---|---|---|
| 7,938,543 | B2 | 5/2011 | Gerets et al. | |
| 11,125,968 | B2 * | 9/2021 | Yang | G02B 7/181 |
| 2004/0021830 | A1 * | 2/2004 | Fujimori | H04N 9/3144 353/30 |
| 2006/0176453 | A1 * | 8/2006 | Miyamoto | G03B 21/008 348/E5.142 |

(Continued)

FOREIGN PATENT DOCUMENTS

| | | |
|---|---|---|
| CN | 102162939 | 8/2011 |
| CN | 106054508 | 10/2016 |

(Continued)

OTHER PUBLICATIONS

"Office Action of China Counterpart Application", issued on Mar. 27, 2026, p. 1-p. 11.

*Primary Examiner* — Bao-Luan Q Le
(74) *Attorney, Agent, or Firm* — JCIPRNET

(57) ABSTRACT

A projection device including a light source module, an optical engine module and a projection lens is provided. The optical engine module includes a casing, a heat-conducting base, a heat pipe, a light valve and a thermal conductive layer. The casing has an opening. The heat-conducting base has an assembly opening, wherein the heat-conducting base is disposed on the casing, and the assembly opening is aligned with the opening of the casing. The heat pipe is connected to the heat-conducting base and disposed on the heat-conducting base. The light valve is disposed on the heat-conducting base corresponding to the assembly opening. The light valve is thermally coupled to the heat- (Continued)

conducting base through the thermal conductive layer. The light valve has a first stepped surface and a second stepped surface, and the thermal conductive layer covers at least a part of the first stepped surface and the second stepped surface.

13 Claims, 5 Drawing Sheets

(56) References Cited

U.S. PATENT DOCUMENTS

| | | | | |
|---|---|---|---|---|
| 2006/0261457 | A1* | 11/2006 | Rancuret | H01L 23/4006 257/679 |
| 2009/0135564 | A1* | 5/2009 | Chen | H05K 7/20472 361/709 |
| 2010/0271782 | A1* | 10/2010 | Miyashita | G06F 1/20 361/707 |
| 2010/0271783 | A1* | 10/2010 | Miyashita | G03B 21/16 361/707 |
| 2011/0181937 | A1* | 7/2011 | Miyashita | G02F 1/133308 359/263 |
| 2011/0194037 | A1 | 8/2011 | Hirabayashi et al. | |
| 2011/0199733 | A1* | 8/2011 | Hirabayashi | G02F 1/133382 361/707 |
| 2016/0309125 | A1* | 10/2016 | Hou | H04N 9/3197 |
| 2017/0255006 | A1* | 9/2017 | Hou | G02B 7/181 |
| 2017/0277026 | A1* | 9/2017 | Ikeo | G03B 21/16 |
| 2019/0179217 | A1* | 6/2019 | Tang | G03B 21/008 |
| 2020/0218141 | A1* | 7/2020 | Van Rafelghem | G03B 21/16 |
| 2023/0221521 | A1* | 7/2023 | Thomas | G03F 7/70075 353/52 |

FOREIGN PATENT DOCUMENTS

| | | |
|---|---|---|
| CN | 111108438 | 5/2020 |
| CN | 111175967 | 5/2020 |
| CN | 111856855 | 2/2022 |
| JP | 2004085943 | 3/2004 |
| JP | 2007041414 | 2/2007 |
| JP | 2010256663 | 11/2010 |
| JP | 2010256666 | 11/2010 |
| JP | 2013073185 | 4/2013 |

* cited by examiner

PROJECTION DEVICE

CROSS-REFERENCE TO RELATED APPLICATION

This application claims the priority benefit of China application serial no. 202211082420.X, filed on Sep. 6, 2022. The entirety of the above-mentioned patent application is hereby incorporated by reference herein and made a part of this specification.

BACKGROUND

Technical Field

The invention relates to a projection device, and particularly relates to a projection device with a heat dissipation design.

Description of Related Art

In a common projection device, a light valve is used to convert an illumination beam from a light source module into an image beam, and then, the image beam is transmitted to a projection lens and projected out of the projection device by the projection lens. Along with improvement of a projection brightness of the projection device, heat generated by the light valve increases greatly, resulting in an excessive temperature difference between a front end of the light valve and a rear end of the light valve, which reduces projection quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection device, which improves heat dissipation efficiency of a light valve, reduces a temperature difference between a front end of the light valve and a rear end of the light valve, and improves projection quality.

Other objects and advantages of the invention may be further illustrated by the technical features broadly embodied and described as follows.

In order to achieve one or a portion of or all of the objects or other objects, an embodiment of the invention provides a projection device including a light source module, an optical engine module and a projection lens. The light source module is configured to provide an illumination beam. The optical engine module includes a casing, a heat-conducting base, a heat pipe, a light valve and a thermal conductive layer. The casing has an opening. The heat-conducting base has an assembly opening, wherein the heat-conducting base is disposed on the casing, and the assembly opening is aligned with the opening of the casing. The heat pipe is connected to the heat-conducting base and is disposed on the heat-conducting base. The light valve is disposed on a transmission path of the illumination beam, wherein the light valve is configured to convert the illumination beam into an image beam, and the light valve is disposed on the heat-conducting base corresponding to the assembly opening. The thermal conductive layer is disposed between the light valve and the heat-conducting base. The light valve is thermally coupled to the heat-conducting base through the thermal conductive layer, wherein the light valve has a first stepped surface and a second stepped surface parallel to each other, and the thermal conductive layer covers at least a part of the first stepped surface and the second stepped surface. The projection lens is disposed on a transmission path of the image beam. The projection lens is configured to project the image beam out of the projection device.

In an embodiment of the invention, the heat-conducting base further has a first surface and a second surface parallel to each other. The thermal conductive layer covers at least a part of the first surface and the second surface. Orthogonal projections of at least a part of the first stepped surface and at least a part of the second stepped surface are respectively overlapped with at least a part of the first surface and at least a part of the second surface.

In an embodiment of the invention, the light valve further has a first side surface connecting the first stepped surface and the second stepped surface. The first side surface is located outside the assembly opening of the heat-conducting base. The thermal conductive layer covers at least a part of the first side surface.

In an embodiment of the invention, the heat-conducting base further has a third surface. The third surface is parallel to the first side surface of the light valve, and the thermal conductive layer covers at least a part of the third surface.

In an embodiment of the invention, the light valve further has a second side surface connected to the first stepped surface. The second side surface extends toward the opening, and the second side surface is located in the assembly opening of the heat-conducting base. The thermal conductive layer covers at least a part of the second side surface.

In an embodiment of the invention, the heat-conducting base further has a fourth surface, where the fourth surface is parallel to the second side surface of the light valve, and the thermal conductive layer covers at least a part of the fourth surface.

In an embodiment of the invention, the light valve further has an imaging surface connected to the second side surface, where the imaging surface is located in the opening of the casing, and the imaging surface is parallel to the first stepped surface.

In an embodiment of the invention, the thermal conductive layer has a bottom surface parallel to the first stepped surface, where the heat-conducting base further has a frame, and the frame has a receiving surface. The bottom surface of the thermal conductive layer is connected to the receiving surface of the frame.

In an embodiment of the invention, the thermal conductive layer has a first surface and a second surface parallel to each other. The first surface and the second surface are respectively in contact and connected with the first stepped surface and the second stepped surface.

In an embodiment of the invention, the light valve further has a first side surface connecting the first stepped surface and the second stepped surface. The thermal conductive layer further has a third surface connecting the first surface and the second surface, and the third surface is in contact and connected with the first side surface of the light valve.

In an embodiment of the invention, the light valve has a second side surface connected to the first stepped surface, where the second side surface extends toward the opening, and the second side surface is located in the assembly opening. The thermal conductive layer further has a fourth surface connected to the first surface, and the fourth surface is in contact and connected with the second side surface of the light valve.

In an embodiment of the invention, the thermal conductive layer is a thermal conductive pad or a thermal conductive adhesive, and a material of the thermal conductive layer includes silicon, graphite or ceramic powder.

In an embodiment of the invention, the casing further has a plurality of positioning protrusions. The plurality of positioning protrusions are located around the opening. The heat-conducting base further has a plurality of positioning holes. The plurality of positioning holes are located around the assembly opening. The plurality of positioning protrusions penetrate through the plurality of positioning holes, and the plurality of positioning protrusions are used for positioning the light valve.

In an embodiment of the invention, the plurality of positioning protrusions contact the second stepped surface.

In an embodiment of the invention, the optical engine module further includes heat dissipation fins thermally coupled to the heat pipe. A first end of the heat pipe is adjacent to the heat-conducting base, and a second end of the heat pipe is adjacent to the heat dissipation fins.

Based on the above description, the embodiments of the invention at least have one of following advantages and effects. In the projection device of the invention, the first stepped surface and the second stepped surface of the front end of the light valve are thermally coupled to the heat-conducting base through the thermal conductive layer, so as to increase a heat dissipation area of the front end of the light valve and improve heat dissipation efficiency of the light valve. In addition, heat at the front end of the light valve may be quickly dissipated, which helps to reduce a temperature difference between the front end of the light valve and the rear end of the light valve, so as to improve the projection quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
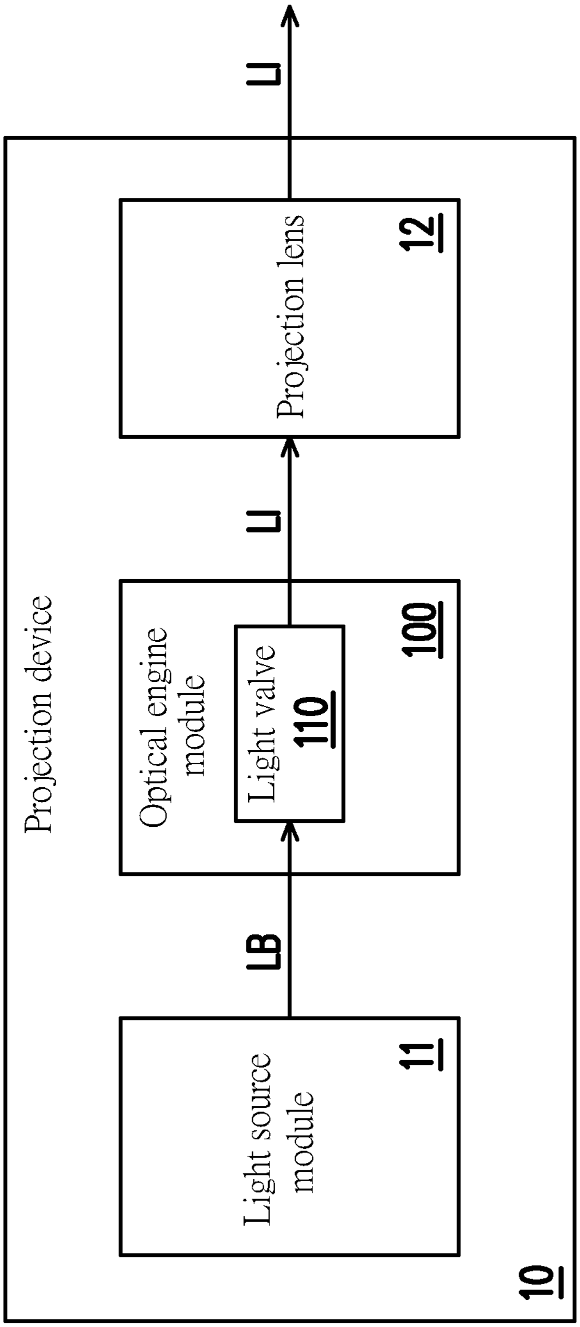
FIG. 1 is a schematic diagram of a projection device according to an embodiment of the invention.

FIG. 1 is a schematic diagram of a projection device according to an embodiment of the invention. Referring to FIG. 1, the projection device 10 includes a light source module 11, an optical engine module 100 and a projection lens 12. The light source module 11 is used for providing an illumination light beam LB. The light source module 11 may be composed of at least one light-emitting element, a wavelength conversion element, a light homogenizing element, a filter element, and at least one light guide element to provide light beams with different wavelengths to serve as a source of the illumination beam LB. The plurality of light-emitting elements may be light-emitting diodes (LEDs) or laser diodes (LDs), but the invention does not limit the type or shape of the light source module 11, and since enough instructions, recommendations, and implementation descriptions on detailed structure and implementation thereof may be learned from common knowledge of the related technical field, detailed description thereof is not repeated.

The optical engine module 100 includes a light valve 110, the light valve 110 is disposed on a transmission path of the illumination beam LB, and the light valve 110 is configured to convert the illumination beam LB into an image beam LI. For example, the light valve 110 may be a reflective light modulator such as a liquid crystal on silicon panel or a digital micro-mirror device, etc. Alternatively, the light valve 110 may be a transmissive light modulator such as a transparent liquid crystal panel, an electro-optical modulator, a magneto-optic modulator, or an acousto-optic modulator. The invention does not limit a pattern and type of the light valve 110. Regarding a method that the light valve 110 converts the illumination beam LB into the image light beam LI, enough instructions, recommendations, and implementation descriptions on detailed steps and implementation thereof may be learned from common knowledge of the related technical field, and details thereof are not repeated.

The projection lens 12 is disposed on a transmission path of the image beam L1, and the projection lens 12 is configured to project the image beam L1 coming from the light valve 110 out of the projection device 10 and onto a projection target, where the projection target is, for example, a screen or a wall. The projection lens 12 may include a combination of one or a plurality of optical lenses having dioptric powers, such as various combinations of non-planar lenses including a biconcave lens, a biconvex lens, a concavo-convex lens, a convexo-concave lens, a plano-convex lens, a plano-concave lens, etc. In an embodiment, the projection lens 12 may further include a planar optical lens, which projects the image beam LI out of the projection device in a reflective manner. The invention does not limit the pattern and type of the projection lens 12.

Figure 2:
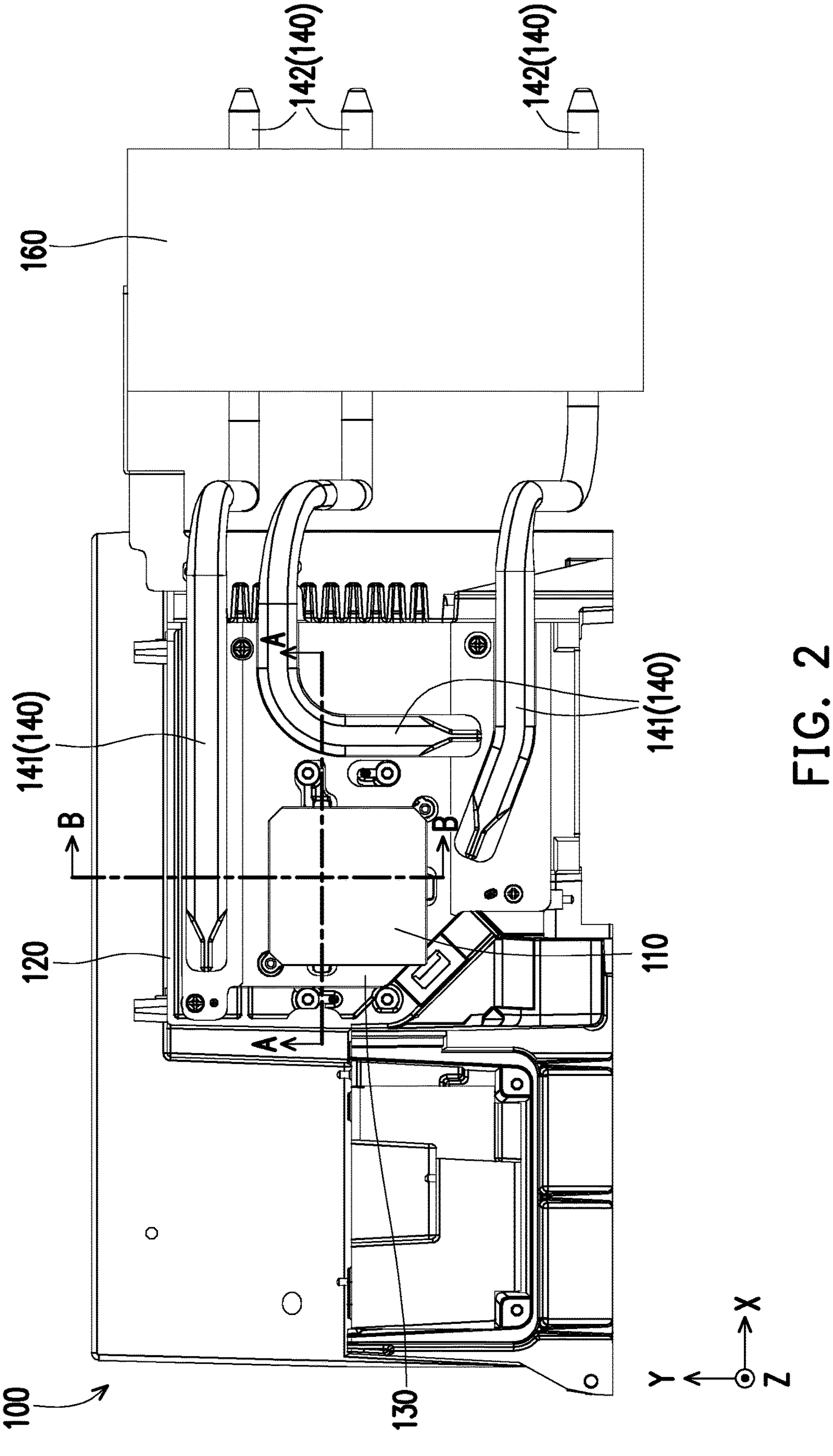
FIG. 2 is a schematic top view of an optical engine module according to an embodiment of the invention.
Figure 3:
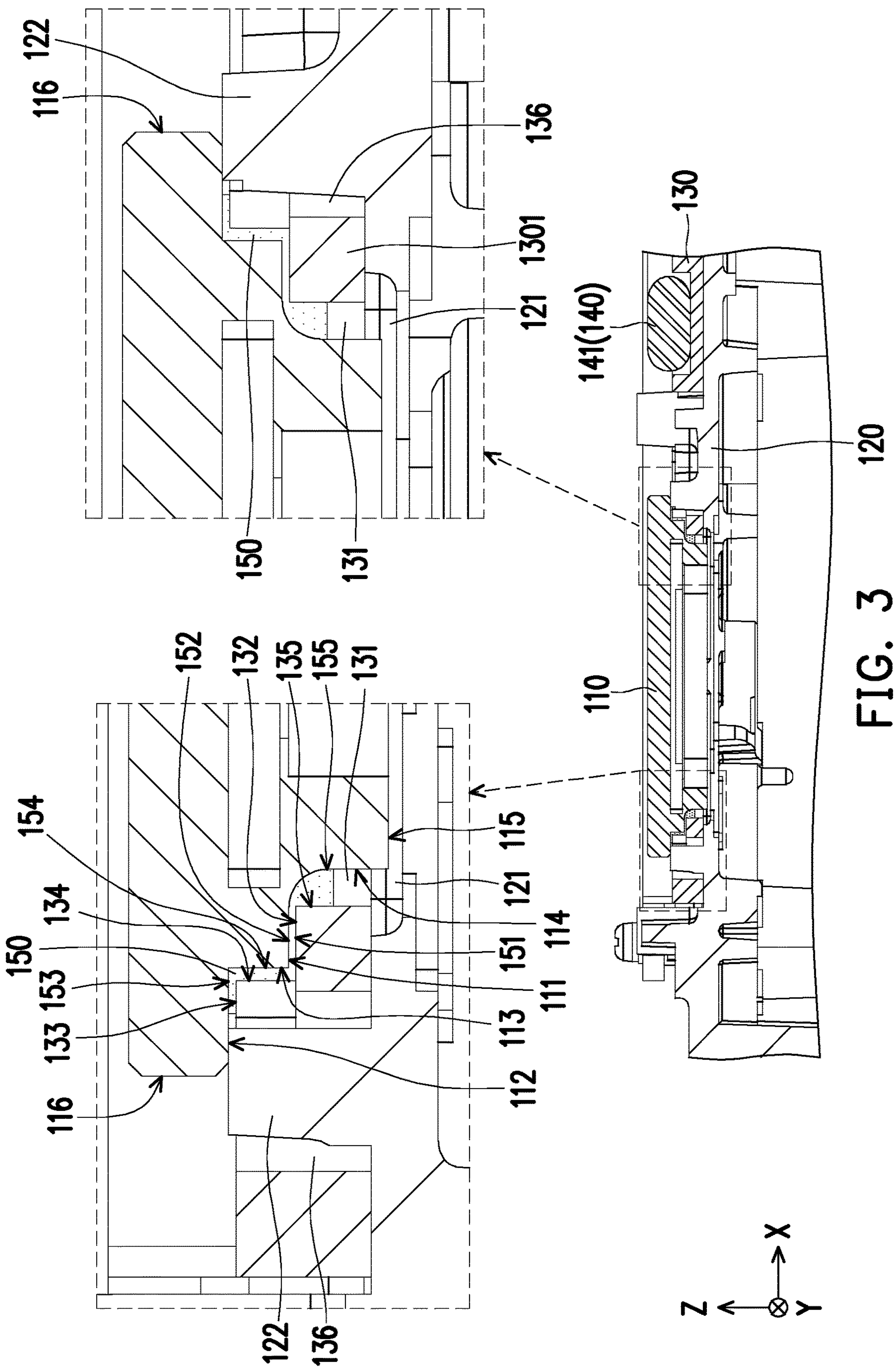
FIG. 3 is a schematic partial cross-sectional view along a section line A-A of FIG. 2.
Figure 4:
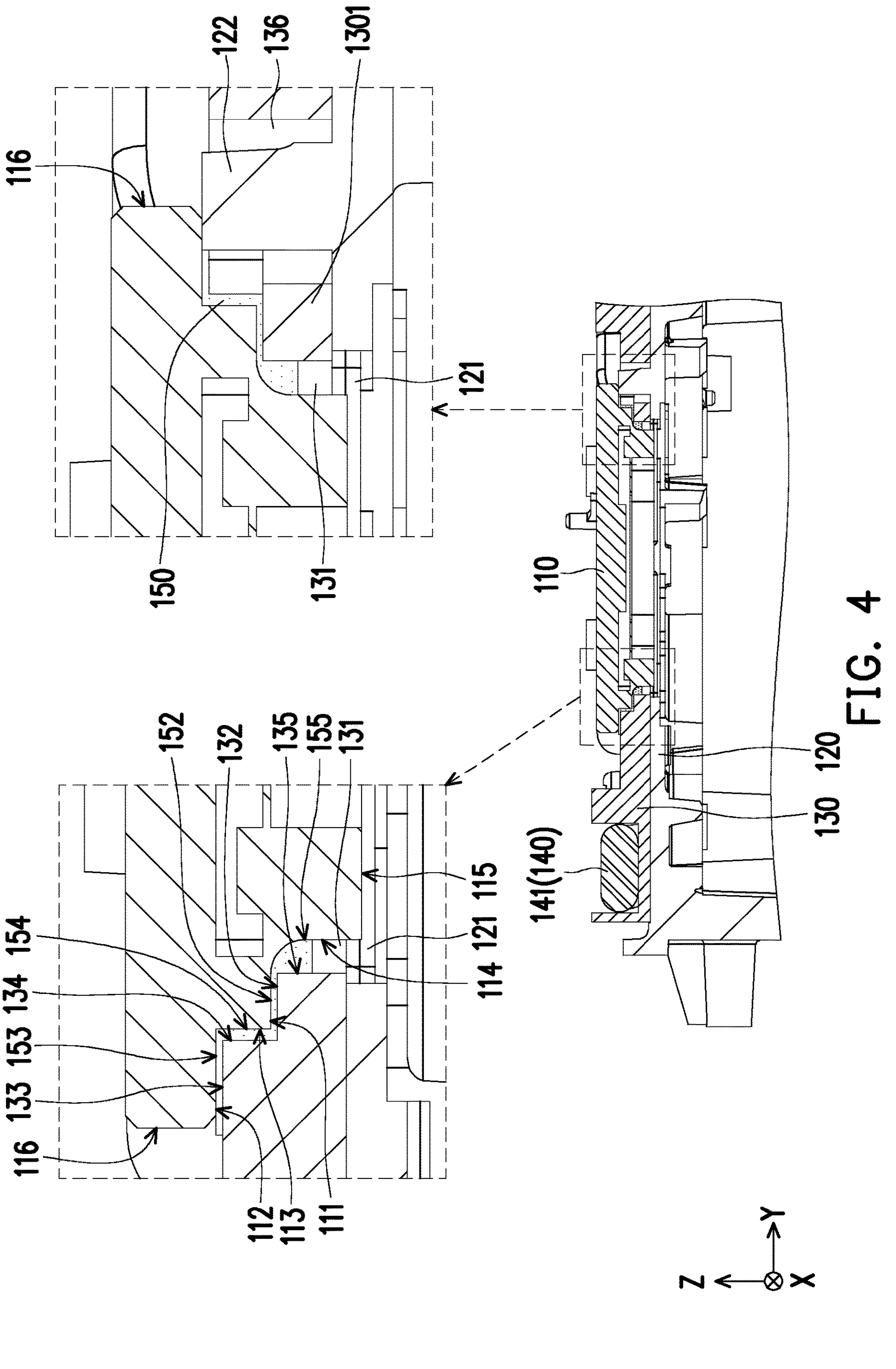
FIG. 4 is a schematic partial cross-sectional view along a section line B-B of FIG. 2.

FIG. 2 is a schematic top view of an optical engine module according to an embodiment of the invention. FIG. 3 is a schematic partial cross-sectional view along a section line A-A of FIG. 2. FIG. 4 is a schematic partial cross-sectional view along a section line B-B of FIG. 2. Referring to FIG. 2 to FIG. 4, the optical engine module 100 further includes a casing 120, a heat-conducting base 130, a heat pipe 140 and a thermal conductive layer 150. The casing 120 has an opening 121. The heat-conducting base 130 has an assembly opening 131 aligned with the opening 121. The heat-conducting base 130 is disposed on the casing 120 and thermally coupled to the casing 120. The heat pipe 140 is connected to the heat-conducting base 130, where at least a part of the heat pipe 140 is disposed on the heat-conducting base 130, and the heat pipe 140 is thermally coupled to the heat-conducting base 130. The light valve 110 is disposed on the heat-conducting base 130 corresponding to the assembly opening 131, and is thermally coupled to the heat-conducting base 130 through the thermal conductive layer 150.

In the embodiment, the light valve 110 includes a front end and a rear end. The front end of the light valve 110 is an end adjacent to the opening 121 of the casing 120, and more specifically, the front end is an end that receives the illumination beam LB and emits the image beam LI. In contrast, the rear end of the light valve 110 is defined as an end facing away from the opening 121. As shown in FIGS. 3 and 4, the heat pipe 140 is thermally coupled to the heat-conducting base 130, and the heat-conducting base 130 is thermally coupled to the casing 120 and the thermal conductive layer 150. Therefore, the heat generated by the front end of the light valve 110 may be dissipated through two heat dissipation paths. A first heat dissipation path is: the heat generated from the front end of the light valve 110 is first conducted through the casing 120 and then through the heat-conducting base 130, and is then conducted to the heat pipe 140; a second heat dissipation path is: the heat generated from the front end of the light valve 110 is first conducted through the thermal conductive layer 150 and then through the heat-conducting base 130, and is then conducted to the heat pipe 140. Based on the above design, a heat dissipation area and heat dissipation path of the front end of the light valve 110 may be increased, which helps to improve the heat dissipation efficiency of the light valve 110. In addition, the heat at the front end of the light valve 110 may be quickly dissipated, which helps to reduce the temperature difference between the front end and the rear end of the light valve 110, so as to avoid excessively high temperature of the light valve 110 and excessively high temperature difference between the front end and the rear end of the light valve 110 from damaging the optical components in the projection device 10 to affect the projection quality, thereby improving the projection quality and service life of the projection device 10.

In the embodiment, the thermal conductive layer 150 may be a thermal conductive pad or a thermal conductive adhesive, and a material of the thermal conductive layer 150 is a thermal interface material (TIM). The thermal conductive layer 150 may, for example, include silicon, graphite or ceramic powder. In addition, a thermal conductivity of the thermal conductive layer 150 is greater than 0.024 W/(m K), and preferably, the thermal conductivity of the thermal conductive layer 150 is greater than 0.1 W/(m K). An air gap between the light valve 110 and the heat-conducting base 130 generated due to a rough contact surface may be filled by the heat conducting layer 150, so as to reduce a thermal resistance between the front end of the light valve 110 and the heat-conducting base 130 and improve the heat dissipation performance. As shown in FIG. 3 and FIG. 4, the front end of the light valve 110 has a first stepped surface 111 and a second stepped surface 112 parallel to each other, where the thermal conductive layer 150 covers at least a part or all of the first stepped surface 111 and covers at least a part or all of the second stepped surface 112 in order to increase a heat dissipation area of the front end of the light valve 110, and reduce the thermal resistance between the front end of the light valve 110 and the heat-conducting base 130.

As shown in FIG. 3 and FIG. 4, the heat-conducting base 130 further has a first surface 132 and a second surface 133 parallel to each other, where the first surface 132 faces the first stepped surface 111, and an orthogonal projection of at least a part of the first stepped surface 111 in an axial direction Z is overlapped with at least a part of the first surface 132. The second surface 133 faces the second stepped surface 112, and an orthogonal projection of at least a part of the second stepped surface 112 in the axial direction Z is overlapped with at least a part of the second surface 133. A part of the thermal conductive layer 150 is disposed between the first surface 132 and the first stepped surface 111, and the thermal conductive layer 150 covers at least a part or all of the first surface 132, i.e., the first stepped surface 111 is in contact with the first surface 132 through the thermal conductive layer 150. Another part of the thermal conductive layer 150 is disposed between the second surface 133 and the second stepped surface 112, and the thermal conductive layer 150 covers at least a part or all of the second surface 133, i.e., the second stepped surface 112 is in contact with the second surface 133 through the thermal conductive layer 150.

The light valve 110 further has a first side surface 113 connecting the first stepped surface 111 and the second stepped surface 112, where a range that the thermal conductive layer 150 covers the light valve 110 may extend from the first stepped surface 111 to the second stepped surface 112 through the first side surface 113, and at least a part or all of the first side surface 113 is covered by the thermal conductive layer 150. In addition, the heat-conducting base 130 further has a third surface 134, where the third surface 134 faces the first side surface 113 of the light valve 110, and the third surface 134 and the first side surface 113 are parallel to each other. A range that the thermal conductive layer 150 covers the heat-conducting base 130 may extend from the first surface 132 to the second surface 133 through the third surface 134, and at least a part or all of the third surface 134 is covered by the thermal conductive layer 150. Therefore, the first side surface 113 may contact the third surface 134 through the thermal conductive layer 150.

As shown in FIG. 3 and FIG. 4, the front end of the light valve 110 is a stepped structure composed of the first stepped surface 111, the first side surface 113 and the second stepped surface 112, and is located outside the assembly opening 131 of the heat-conducting base 130. As shown in FIG. 3, the stepped structure formed by the first stepped surface 111, the first side surface 113 and the second stepped surface 112 may first extend along an axial direction X, then turn to extend along the axial direction Z, and then turn to extend along the axial direction X. As shown in FIG. 4, the stepped structure formed by the first stepped surface 111, the first side surface 113 and the second stepped surface 112 may first extend along an axial direction Y, then turn to extend along the axial direction Z, and then turn to extend along the axial direction Y.

Correspondingly, the first surface 132, the third surface 134 and the second surface 133 of the heat-conducting base 130 form a stepped structure and are located outside the assembly opening 131. The first surface 132, the third surface 134 and the second surface 133 are respectively used to receive the first stepped surface 111, the first side surface 113 and the second stepped surface 112 of the light valve 110. As shown in FIG. 3, the stepped structure formed by the first surface 132, the third surface 134 and the second surface 133 may first extend along the axial direction X, then turn to extend along the axial direction Z, and then turn to extend along the axial direction X. As shown in FIG. 4, the stepped structure formed by the first surface 132, the third surface 134 and the second surface 133 may first extend along the axial direction Y, then turn to extend along the axial direction Z, and then turn to extend along the axial direction Y.

As shown in FIG. 3 and FIG. 4, the light valve 110 further has a second side surface 114 connected to the first stepped surface 111, and the first side surface 113 and the second side surface 114 are respectively connected to two opposite sides of the first stepped surface 111. The second side surface 114 may extend from one side of the first stepped surface 111 to the opening 121 along the axial direction Z, and the second side surface 114 is located in the assembly opening 131 of the heat-conducting base 130. In addition, a range that the thermal conductive layer 150 covers the light valve 110 may further extend from the first stepped surface 111 to the second side surface 114 and cover at least a part of the second side surface 114.

Correspondingly, the heat-conducting base 130 further has a fourth surface 135, and the third surface 134 and the fourth surface 135 are respectively connected to two opposite sides of the first surface 132. The fourth surface 135 may extend from one side of the first surface 132 along the axial direction Z, and the fourth surface 135 defines a range of the assembly opening 131. The fourth surface 135 of the heat-conducting base 130 faces the second side surface 114 of the light valve 110, and at least a part of the fourth surface 135 of the heat-conducting base 130 is parallel to at least a part of the second side surface 114 of the light valve 110. A range that the thermal conductive layer 150 covers the heat-conducting base 130 may further extend from the first surface 132 to the fourth surface 135 and cover at least a part of the fourth surface 135. Namely, the second side 114 may contact the fourth surface 135 through the thermal conductive layer 150.

The light valve 110 further has an imaging surface 115 connected to the second side surface 114, where the imaging surface 115 is located in the opening 121 of the casing 120, and the imaging surface 115 is parallel to the first stepped surface 111, and is respectively connected to two opposite sides of the second side surface 114. The imaging surface 115 is an incident surface of the illumination beam LB and an emit surface of the image beam LI. In addition, a range that the thermal conductive layer 150 covers the light valve 110 may further extend from the second side surface 114 to the imaging surface 115, and may further extend from the second stepped surface 112 to the third side surface 116. In the embodiment, the thermal conductive layer 150 is in direct contact with at least two of the third side surface 116, the second stepped surface 112, the first side surface 113, the first stepped surface 111, the second side surface 114 and the imaging surface 115 of the light valve 110. In an exemplary embodiment, an upper surface of the thermal conductive layer 150 is attached to the second stepped surface 112, the first side surface 113, the first stepped surface 111 and the second side surface 114 of the light valve 110, and a lower surface of the thermal conductive layer 150 is attached to the second surface 133, the third surface 134, the first surface 132 and the fourth surface 135 of the heat-conducting base 130. Through the stepped structure of the light valve 110 and the heat-conducting base 130, a thickness of the thermal conductive layer 150 may be reduced, thereby increasing the heat dissipation area of the front end of the light valve 110, and reducing the thermal resistance between the front end of the light valve 110 and the thermal conductive layer 150. In addition, in addition, the thermal conductive layer 150 has a uniform thickness, i.e., a distance between the upper surface and the lower surface of the thermal conductive layer 150 is a constant value, so that manufacturing cost and manufacturing difficulty of the optical engine module 100 may be reduced.

As shown in FIG. 3 and FIG. 4, the heat-conducting base 130 further has a frame 1301, where the frame 1301 may be a metal frame or a frame composed of other high thermal conductivity materials. In detail, the frame 1301 has a receiving surface surrounding the assembly opening 131, such as the first surface 132. On the other hand, the thermal conductive layer 150 has a bottom surface 151 parallel to the first stepped surface 111, where the bottom surface 151 faces away from the first stepped surface 111 and is in contact and connected with the receiving surface (for example, the first surface 132) of the frame 1301.

The thermal conductive layer 150 has a first surface 152 and a second surface 153 parallel to each other, where the first surface 152 faces the first stepped surface 111 and is in contact and connected with the first stepped surface 111. In addition, the second surface 153 faces the second stepped surface 112 and is in contact and connected with the second stepped surface 112. The thermal conductive layer 150 further has a third surface 154 connecting the first surface 152 and the second surface 153, where the third surface 154 faces the first side surface 113 and is in contact and connected with the first side surface 113.

Further, the first surface 152, the third surface 154 and the second surface 153 of the thermal conductive layer 150 form a stepped structure and are located outside the assembly opening 131 for receiving the light valve 110. As shown in FIG. 3, the stepped structure formed by the first surface 152, the third surface 154 and the second surface 153 may first extend along the axial direction X, then turn to extend along the axial direction Z, and then turn to extend along the axial direction X. As shown in FIG. 4, the stepped structure formed by the first surface 152, the third surface 154 and the second surface 153 may first extend along the axial direction Y, then turn to extend along the axial direction Z, and then turn to extend along the axial direction Y.

As shown in FIG. 3 and FIG. 4, the thermal conductive layer 150 further has a fourth surface 155 connected to the first surface 152, and the third surface 154 and the fourth surface 155 are respectively connected to two opposite sides of the first surface 152. The fourth surface 155 may extend from one side of the first surface 152 toward the opening 121 along the axial direction Z, where the second side surface 114 and the fourth surface 155 are located in the assembly opening 131 of the heat-conducting base 130, and the fourth surface 155 is in contact and connected with the second side surface.

As shown in FIG. 2 to FIG. 4, the heat generated by the front end of the light valve 110 may be transferred to the thermal conductive layer 150 through the first stepped surface 111, the second stepped surface 112, the first side surface 113 and the second side surface 114, and then transferred to the heat-conducting base 130 from the thermal conductive layer 150, and then the heat is finally transferred to the heat pipe 140 from the heat-conducting base 130, and the heat pipe 140 takes the heat away. Further, the optical engine module 100 further includes heat dissipation fins 160. A first end 141 (for example, an evaporation end) of the heat pipe 140 is adjacent to or thermally coupled to the heat-conducting base 130, and a second end 142 (for example, a condensation end) of the heat pipe 140 is adjacent to the heat dissipation fins 160 or passes through the heat dissipation fins 160.

On the other hand, the casing 120 further has a plurality of positioning protrusions 122 located around the opening 121, and the heat-conducting base 130 further has a plurality of positioning holes 136 located around the assembly opening 131. The plurality of positioning protrusions 122 penetrate through the plurality of positioning holes 136 to position the heat-conducting base 130 on the casing 120, and correspond the light valve 110 to the opening 121 to position the light valve 110 on the casing 120. Further, the plurality of positioning protrusions 122 contact the second stepped surface 112 of the light valve 110, so that the heat generated by the front end of the light valve 110 may be transferred to the casing 120 through the second stepped surface 112, and then transferred to the heat-conducting base 130 from the casing 120, and finally transmitted to the heat pipe 140 from the heat-conducting base 130, and the heat pipe 140 takes the heat away.

Figure 5:
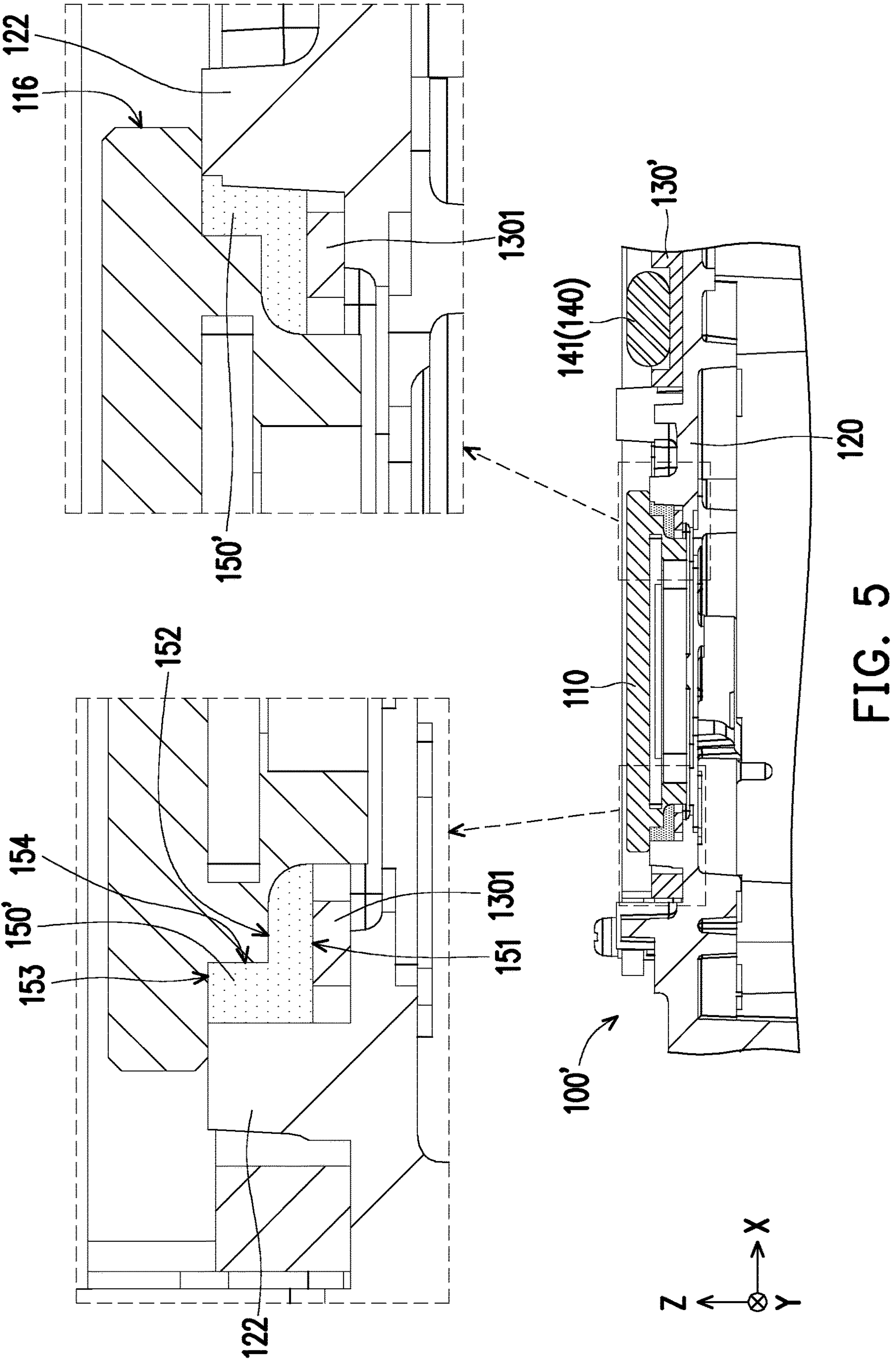
FIG. 5 is a schematic diagram of an optical engine module according to another embodiment of the invention.

FIG. 5 is a schematic diagram of an optical engine module according to another embodiment of the invention. As shown in FIG. 5, a structure of an optical engine module 100' of FIG. 5 is similar to that of the optical engine module 100 of FIG. 3, and a difference there between lies in shapes of a heat-conducting base 130' and a thermal conductive layer 150' of the optical engine module 100'. To be specific, the first surface 152, the third surface 154 and the second surface 153 of the thermal conductive layer 150' are in contact and connected with the light valve 110, and the bottom surface 151 of the thermal conductive layer 150' is in contact and connected with the receiving surface of the frame 1301 of the heat-conducting base 130'. In addition, the positioning protrusions 122 of the casing 120 may also be in contact and connected with the thermal conductive layer 150'. In the embodiment, a gap between the light valve 110 and the heat-conducting base 130' may be filled by the stepped structure of the thermal conductive layer 150', so as to improve the heat dissipation performance.

In summary, in the projection device of the invention, the stepped surface of the front end of the light valve is thermally coupled to the heat-conducting base through the thermal conductive layer, so as to increase the heat dissipation area of the front end of the light valve and improve the heat dissipation efficiency of the light valve. In addition, the heat at the front end of the light valve may be quickly dissipated, which helps to reduce the temperature difference between the front end of the light valve and the rear end of the light valve, so as to improve the projection quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:

a light source module, configured to provide an illumination beam;

an optical engine module, comprising:

a casing, having an opening and a plurality of positioning protrusions located around the opening;

a heat-conducting base, having an assembly opening and a plurality of positioning holes located around the assembly opening, wherein the heat-conducting base is disposed on the casing, and the assembly opening is aligned with the opening of the casing;

a heat pipe, connected to the heat-conducting base, and disposed on the heat-conducting base;

a light valve, disposed on a transmission path of the illumination beam, wherein the light valve is configured to convert the illumination beam into an image beam, and the light valve is disposed on the heat-conducting base corresponding to the assembly opening; and a thermal conductive layer, disposed between the light valve and the heat-conducting base, the light valve being thermally coupled to the heat-conducting base through the thermal conductive layer, wherein the light valve has a first stepped surface and a second stepped surface parallel to each other, and the thermal conductive layer covers at least a part of the first stepped surface and the second stepped surface; and a projection lens, disposed on a transmission path of the image beam, and configured to project the image beam out of the projection device, wherein the plurality of positioning protrusions penetrate through the plurality of positioning holes to position the light valve, the plurality of positioning protrusions thermally contact the second stepped surface, wherein a part of an orthographic projection of each of the plurality of positioning protrusions on a reference plane parallel to the first stepped surface does not overlap with an orthographic projection of the light valve on the reference plane, and an other part of the orthographic projection of each of the plurality of positioning protrusions on the reference plane overlaps with the orthographic projection of the light valve on the reference plane.

2. The projection device as claimed in claim 1, wherein the heat-conducting base further has a first surface and a second surface parallel to each other, the thermal conductive layer covers at least a part of the first surface and the second surface, and orthogonal projections of at least a part of the first stepped surface and at least a part of the second stepped surface on the reference plane are respectively overlapped with at least a part of the first surface and at least a part of the second surface on the reference plane.

3. The projection device as claimed in claim 1, wherein the light valve further has a first side surface connecting the first stepped surface and the second stepped surface, the first side surface is located outside the assembly opening of the heat-conducting base, and the thermal conductive layer covers at least a part of the first side surface.

4. The projection device as claimed in claim 3, wherein the heat-conducting base further has a third surface, the third surface is parallel to the first side surface of the light valve, and the thermal conductive layer covers at least a part of the third surface.

5. The projection device as claimed in claim 1, wherein the light valve further has a second side surface connected to the first stepped surface, the second side surface extends toward the opening, and the second side surface is located in the assembly opening of the heat-conducting base, and the thermal conductive layer covers at least a part of the second side surface.

6. The projection device as claimed in claim 5, wherein the heat-conducting base further has a fourth surface, wherein the fourth surface is parallel to the second side surface of the light valve, and the thermal conductive layer covers at least a part of the fourth surface.

7. The projection device as claimed in claim 5, wherein the light valve further has an imaging surface connected to the second side surface, wherein the imaging surface is located in the opening of the casing, and the imaging surface is parallel to the first stepped surface.

8. The projection device as claimed in claim 1, wherein the thermal conductive layer has a bottom surface parallel to the first stepped surface, the heat-conducting base further has a frame, the frame has a receiving surface, and the bottom surface is connected to the receiving surface.

9. The projection device as claimed in claim 1, wherein the thermal conductive layer has a first surface and a second surface parallel to each other, the first surface and the second surface are respectively in contact and connected with the first stepped surface and the second stepped surface.

10. The projection device as claimed in claim 9, wherein the light valve further has a first side surface connecting the first stepped surface and the second stepped surface, the thermal conductive layer further has a third surface connecting the first surface and the second surface, and the third surface is in contact and connected with the first side surface of the light valve.

11. The projection device as claimed in claim 9, wherein the light valve has a second side surface connected to the first stepped surface, wherein the second side surface extends toward the opening, and the second side surface is located in the assembly opening, the thermal conductive layer further has a fourth surface connected to the first surface, and the fourth surface is in contact and connected with the second side surface of the light valve.

12. The projection device as claimed in claim 1, wherein the thermal conductive layer is a thermal conductive pad or a thermal conductive adhesive, and a material of the thermal conductive layer comprises silicon, graphite or ceramic powder.

13. The projection device as claimed in claim 1, wherein the optical engine module further comprises heat dissipation fins thermally coupled to the heat pipe, a first end of the heat pipe is adjacent to the heat-conducting base, and a second end of the heat pipe is adjacent to the heat dissipation fins.

* * * * *